United States Patent [19]

Halasa et al.

[11] 4,174,431

[45] Nov. 13, 1979

[54] PROCESS FOR POLYMERIZING CONJUGATED DIENES

[75] Inventors: Adel F. Halasa, Bath; James E. Hall, Akron; Donald N. Schulz, Hartville, all of Ohio

[73] Assignee: The Firestone Tire & Rubber Company, Akron, Ohio

[21] Appl. No.: 937,007

[22] Filed: Aug. 25, 1978

Related U.S. Application Data

[62] Division of Ser. No. 848,958, Nov. 7, 1977, Pat. No. 4,139,490.

[51] Int. Cl.$^2$ .............. C08F 4/50; C08F 4/54; C08F 4/08
[52] U.S. Cl. ............... 526/173; 252/431 C; 252/431 L; 252/431 N; 526/183
[58] Field of Search .................. 526/173, 183

[56] References Cited

U.S. PATENT DOCUMENTS

| | | | |
|---|---|---|---|
| 2,849,432 | 5/1958 | Kibler | 526/180 |
| 3,208,983 | 9/1965 | Natta et al. | 526/183 |
| 3,303,225 | 6/1967 | Hsieh | 252/431 L |
| 3,317,918 | 5/1967 | Foster | 526/173 |
| 3,324,099 | 6/1967 | Trepka | 260/94.4 |
| 3,451,988 | 6/1969 | Langer | 252/431 N |
| 3,691,241 | 9/1972 | Kamienski et al. | 526/173 |
| 3,716,495 | 2/1973 | Hsieh | 252/431 N |
| 3,742,077 | 6/1973 | Kamienski et al. | 260/668 B |
| 3,766,280 | 10/1973 | Kamienski et al. | 526/173 |
| 3,817,955 | 6/1974 | Kamienski et al. | 260/83.7 |
| 3,822,219 | 7/1974 | Kamienski et al. | 252/431 |
| 3,846,385 | 11/1974 | Hagis et al. | 252/431 R |
| 3,847,883 | 11/1974 | Kamienski et al. | 260/37.7 |
| 3,935,177 | 1/1976 | Muller et al. | 526/180 |
| 4,139,490 | 2/1979 | Halasa et al. | 526/173 X |

*Primary Examiner*—William F. Hamrock

[57] ABSTRACT

The process and catalyst system disclosed herein comprises the polymerization of a conjugated diene such as 1,3-butadiene in hydrocarbon solution in the presence of a new catalyst composition comprising:
(a) a dihydrocarbyl magnesium compound of 1-10 carbon atoms, preferably a dialkyl magnesium having 3-8 carbon atoms in each alkyl group, and
(b) an alkali metal compound of the formula R(SM)$_n$, R'$_2$NM, R'NHM or RC≡CM, wherein R is a hydrocarbyl radical of 1-10 carbon atoms, preferably alkyl, n is 1, 2 or 3, M is Li, Na or K, and R' is a hydrocarbyl radical of 1-10 carbon atoms or an acyl radical of 1-10 carbon atoms.

This process is particularly advantageous in that the polymer product can be controlled to have only a relatively small amount of 1,2 structure in accordance with the polymerization temperature. For example, at 125° C. with Li compounds, the product generally has a 1,2 content of 12.6% or less; at 50° C., 10.6% or less; and at 25° C., 7% or less. Where 1,2 contents of 17–25% are desired, these may be obtained by using the Na compounds, and when 1,2 contents of 37–54% are desired, these may be obtained by using K compounds. Where even higher 1,2 contents are desired, they may be obtained by using an amine, such as tetramethylethylenediamine, as an additional catalyst component.

14 Claims, No Drawings

PROCESS FOR POLYMERIZING CONJUGATED DIENES

This is a division of application Ser. No. 848,958 filed Nov. 7, 1977.

BACKGROUND OF THE INVENTION

1. Field of the Invention

This invention relates to a process for the polymerization of a conjugated diene, such as 1,3-butadiene, to a product having less than about 12, preferably less than 10% 1,2 microstructure. More specifically, it relates to the polymerization of the diene in hydrocarbon solution in intimate contact with a catalyst system comprising dihydrocarbyl magnesium and an alkali metal compound.

2. Related Prior Art

A number of Kamienski et al U.S. patents (U.S. Pat. Nos. 3,742,077, 3,822,219 and 3,847,883), disclose the use of a catalyst system comprising a combination of a dialkyl magnesium and alkyl lithium or alkyl potassium. These systems are disclosed as giving very low molecular weight polymers, namely in the range of about 2000 to 4000, even in the absence of telomerizing agents. U.S. Pat. No. 3,822,219 makes one reference (Example XVII) to the use of a complex $(n-C_4H_9K)\cdot(n-C_4H_9MgO\text{-tert.-}C_4H_9)$. Even though a telomerizing agent was used to give a molecular weight of 435, there is no indication that the molecular weight in this case would be any better than the other examples if the telomerizing agent was omitted. Moreover, in those examples where the 1,2 or vinyl content was reported, this was found to be 55–78%, which is undesirably high for many purposes.

U.S. Pat. No. 3,716,495 shows the polymerization of butadiene with a catalyst complex comprising an alkyl lithium with a polyalkyl compound such as diamylmagnesium (Ex. VII). However, the results are somewhat confused due to the fact that the invention is primarily directed to the use of modifying agents of polar type, such as ethers, thioethers and amines.

U.S. Pat. No. 3,817,955 discloses the polymerization of butadiene with a catalyst complex comprising a dialkyl magnesium with either an alkali metal hydride or a tetraalkylammonium hydride. However, here again a molecular weight of only 2100 is reported and the microstructure has 66.42% vinyl.

U.S. Pat. No. 3,846,385 discloses a polymerization catalyst system comprising dibutyl magnesium and a barium dialkoxide such as barium di-tertiarybutoxide. However, this patent gives 80–85% trans-1,4 instead of the more desirable cis-1,4.

U.S. Pat. No. 3,324,099 shows a polymerization initiator comprising a complex formed from an alkyl lithium and a bis-benzylmercaptan compound which is modified in some cases with a tetrahydrocarbyl tin compound.

These cited prior art patents show a variety of catalyst systems giving a variety of results, some favorable and some unfavorable.

SUMMARY OF THE INVENTION

In accordance with the present invention, although neither magnesium dihydrocarbyl compounds nor alkali metal compounds of the formula $R(SM)_n$, $R'_2NM$, $R'NHM$ or $RC\equiv CM$ are by themselves effective polymerization initiators of conjugated dienes, it has now been found that the combination of these two types of compounds is very effective for this purpose. Therefore, very effective catalyst systems for the polymerization of conjugated dienes have been found to comprise the combination of: (1) a magnesium dihydrocarbyl compound, and (2) an alkali metal compound, preferably of Li, Na or K, having the formula $R(SM_n)$, $R'_2NM$, $R'NHM$ or $RC\equiv CM$, where M represents the alkali metal; n is 1, 2 or 3, R represents a hydrocarbyl group of 1–10 carbon atoms, preferably alkyl, and R' represents a hydrocarbyl group of 1–10 carbon atoms or an acyl group of 1–10 carbon atoms; and when the formula is $R'_2NM$, the two R' groups can together represent a divalent group so that they can form with the N a cyclic radical such as piperdyl, morpholino or diethylene diamino.

The hydrocarbyl portion of the magnesium dihydrocarbyl compound may be alkyl, carbocyclic aryl or cycloalkyl. Preferably these are dialkyl compounds such as magnesium dibutyl and magnesium diamyl. The magnesium dihydrocarbyl compounds and methods for their preparation are known in the art.

Dihydrocarbyl magnesium compounds that may be used in the practice of this invention include di-n-propylmagnesium, diisopropylmagnesium, isopropylisobutyl magnesium, di-n-butylmagnesium, di-s-butylmagnesium, s-butyl-n-amylmagnesium, di-n-amylmagnesium, diisoamylmagnesium, dihexylmagnesiums, diheptylmagnesiums, dioctylmagnesiums, dinonylmagnesiums, s-butylisooctyl magnesium, didecylmagnesiums, didodecylmagnesiums, ditridecylmagnesiums, ditetradecylmagnesium, dipentadecylmagnesium, di-p-tolymagnesium, di-p-anisylmagnesium, dibenzylmagnesiums and dixylylmagnesiums. While, as indicated, in the case of the complexes of the dialkylmagnesiums, the alkyl radicals may contain as low as 2 carbon atoms, the use of such complexes is less desirable than the use of those in which the alkyl radicals contain at least 4 carbon atoms. Accordingly, in producing the conjugated diene polymers according to the present invention, it is especially disadvantageous to use complexes, of the dialkylmagnesiums with the alkali metal compounds in which each of the alkyl radicals contains from 4 to 15 carbon atoms and particularly preferred are those in which the alkyl radicals contain from 4 to 5 carbon atoms.

The alkali metal compounds include the Li, Na and K sulfides, amines, amides and acetylides which fit the above formulas. When the alkali metal compound is a sulfide, the R or hydrocarbyl group can be mono-, di- or trivalent so that there are one, two or three -SM groups attached.

Typical alkali metal compounds suitable for the practice of this invention include the Li, Na and K alkyl sulfides, e.g., ethylsulfides, butylsulfides, hexylsulfides, decyl sulfides, phenyl sulfides, tolyl sulfides, cyclohexyl sulfides, cycloheptyl sulfides, disodium 1,4-butanedisulfide, dilithium 1,2-dimercaptoethane, dilithium 1,4-cyclohexyl disulfide, trilithium 1,3,6-octyl trisulfide, disodium 1,4-phenyldisulfide, etc.; amines, such as N-Li methylamine, N-Na ethylamine, N-K butylamine, N-Li butylamine, N-Na amylamine, N-Li phenylamine, N-Na cyclohexyl amine, N-Li dipropylamine, N-Na dibutylamine, N-Li dicyclohexylamine, N-K diphenylamine, N-Li N-methylaniline, N-Na N-ethyl aniline, N-Na diamylamine, N-Li morpholine, N-Na piperidine, N-K diethylene diamine, N-Li diethylene, diamine, etc., and amides, such as N-Li acetylamide, N-Na butyroamide, N-K octoamide, N-Li, N-methyl acetylamide, N-Li benzoylamide, N-Na toluamide, N-Li cyclohexoamide, N-Li morpholine, N-Li piperidine, N-Na diethylenediamine, N,N'1-dilithium diethylenediamine, N-Na N'-methyl diethylene diamine, etc., alkali metal acetylides such as propargyl lithium, Li 2-ethyl acetylide, Na 2-propyl acetylide, K 2-phenyl acetylide, Na 2-cyclohexyl acetylide, etc.

In addition to the sulfides listed above, there may be used dimercapto or trimercapto compounds in which only one of the mercapto groups has an alkali metal substituted thereon thereby leaving one or two unsubstituted mercapto groups or having a hydrocarbyl group substituted. In such cases the R group in fact represents a hydrocarbyl group having a mercapto or hydrocarbyl sulfide group attached thereto, such as in the compound $RSCH_2CH_2S$ Li.

Where not available commercially the sulfides, amines and amides may be prepared by conventional preparations using an appropriate alkali metal alkyl with the appropriate mercaptan, primary or secondary amine, or primary or secondary acylamide in an organic solvent. The acetylides may be prepared by the method known in the art whereby a hydrocarbyl acetylene is added to liquid ammonia containing sodium, lithium or potassium metal dissolved therein.

While neither the alkali metal compounds, such as the sulfides, amides, amines or acetylide compounds nor the dihydrocarbyl magnesium compounds are effective by themselves in giving suitable polymerization of conjugated dienes, the combination apparently gives a complex which effectively initiates and propagates the polymerization of conjugated dienes. With regard to the acetylide compounds, their ineffectiveness as catalysts when used alone is surprising in view of the fact that allyl lithium and alkyl lithium compounds are effective polymerization initiators when used by themselves. Nevertheless, the acetylides are effective only when used in combination with the $R_2Mg$ compounds.

For most effective results, the magnesium/alkali metal molar ratio, sometimes referred to herein as Mg/Li ratio, is generally in the range of 0.01/1 to 100/1, preferably in the range of 0.5/1 to 50/1; and the concentration of the magnesium compound is generally in the range of 0.1–10 millimoles (mM) per hundred grams (phgm) of monomer, preferably 0.33–1 mM phgm.

The polymerization temperature may be in the range of −20° to 125° C., although with lithium compounds the polymerization rate is very slow below 5° C. The preferred range of Li, Na and K compounds is in the range of 50°–80° C. With regard to the resulting 1,2 content of the product, the temperature has only a moderate effect. For example, under one set of conditions, a high temperature of 125° C. gives a 1,2 content of 12.6% whereas under the same conditions a polymerization temperature of 25° C. gives 7% 1,2.

Polymerization is generally completed within 1–10 hours, preferably 2–6 hours. In most cases the conversion is substantially complete. While the reaction is generally completed within the time indicated, allowing the reaction to proceed for longer periods, such as overnight in some cases, does not detract from or harm the products.

Depending on the catalyst concentration, the molecular weights of the products are in the range of 50,000 to 400,000, preferably of 100,000 to 250,000. With potassium catalysts the molecular weight distribution is very broad having a Mw/Mn ratio in the range of 2.5–6.0. Lithium catalysts show corresponding ratios in the range of 1.5 to 3, and sodium catalysts give ratios in the range of 2 to 3.

The catalyst system of this invention has a number of advantages. For example, when a lithium alkyl is used as a polymerization initiator, either by itself or with a modifier such as $R_2Mg$, it is necessary to use expensive equipment and conditions because of the explosive and flammable characteristics of the lithium alkyl. Moreover, the lithium alkyl is also more expensive to prepare and to keep in usable condition. In contrast, the alkali metal components of the present catalyst system are relatively inexpensive compared to the Li or other alkali metal hydrocarbyls and are easily prepared and used.

Moreover, the high temperature polymerization can be effected without the gel formation often accompanying high temperature polymerizations. Because of the ability to effect polymerization to high molecular weights at high temperatures, it is not necessary to remove or dissipate heat from the reaction. Also high product-throughput is permitted and the product does not phase out or precipitate from the solution. Furthermore, the product may have a broad molecular weight distribution and improved processability and its highly branched character makes it desirable for use in the manufacture of tires and other rubber fabricated products.

When the catalyst composition has a lithium compound as the alkali metal component, such as Li butyl sulfide, the vinyl or 1,2 content of the polymer is generally at a low range, for example, 6–14%. When the alkali metal component is a sodium or potassium compound, the vinyl content is generally in the range of 30–54%, for example Na butyl sulfide with dibutyl magnesium gives 30–45%, 1,24and K butyl sulfide with dibutyl magnesium gives 40–54% 1,2.

Advantageously, 10–90%, preferably 50–80%, of an inert diluent is used during the polymerization to facilitate handling of the polymer to give better temperature control. Normally liquid hydrocarbons are suitable for this purpose, such as benzene, toluene and, preferably, saturated aliphatic hydrocarbons, particularly of the straight chain variety, such as n-hexane, n-heptane, etc. The polymerization is generally conducted under pressure to avoid loss of monomer and solvent, particularly since temperatures are generally used at or above the boiling point of one or both. Moreover, an inert atmosphere such as nitrogen is used, and the usual precautions are taken to exclude materials such as water and air that will inactivate or poison the catalyst combination.

Polymerization is advantageously performed in an agitated, pressurized reactor which may be jacketed to allow for temperature control and is equipped with inlets and outlets for introduction of reagents and outflow of product or samples. Pressures are generally autogenous, although inert gases can be charged to the reactor to increase the pressure if desired. Dry nitrogen, argon, helium or other inert gas can be used for this purpose. Normally pressures will be atmospheric or above, and can be as high as 10 atmospheres or more.

Samples may be withdrawn from the reactor periodically during the polymerization to determine percent conversion (by measuring the total solids), color and character of the reaction mass, etc.

When the polymerization has progressed to the desired degree, the product is dropped or run into isopropanol or other medium which deactivates the initiator and precipitates the polymer product. Generally an amount of isopropanol equal in weight to the amount of hexane used is satisfactory for this purpose. It is advantageous also to have an anti-oxidant, such as approximately 1% of di-tertiarybutyl-para-cresol, in the isopropanol. The polymer precipitate is recovered and drum-dried to remove solvent.

Conjugated dienes that may be polymerized, either alone or with each other in accordance with this invention include: 1,3-butadiene, isoprene, chloroprene, 2-phenyl-1,3-butadiene, piperlyene, etc.

Although butadiene homopolymers are preferred in the practice of this invention, butadiene copolymers can also be prepared where the comonomers impart desirable properties and do not detract from the polymer properties. The comonomers may be olefins, such as butene-1, n-butene-2, isobutylene, n-pentene-1, n-pentene-2 and the like, and preferably vinyl arenes, including vinyl aryl or isopropenyl aryl compounds or derivatives thereof having alkyl, aralkyl, cycloalkyl or chlorine attached to the aromatic nucleus and preferably having no more than 20 carbon atoms. Typical of these aromatic comonomers are styrene, alphamethyl styrene, vinyl toluene, isopropenyl toluene, ethyl styrene, p-cyclohexyl styrene, o-, m- and p-Cl-styrene, vinyl napthalene, vinyl ethyl naphthalene, vinyl methyl naphthalene, vinyl butyl naphthalene, isopropenyl naphthalene, isopropenyl methyl naphthalene, 1-vinyl-4-chloronaphthalene, 1-isopropenyl-5-chloronaphthalene, vinyl diphenyl, vinyl diphenylethane, 4-vinyl-4'-methyldiphenyl, 4-vinyl-4'-chlorodiphenyl and the like. Preferably such comonomers have no more than 12 carbon atoms. Where such comonomers are to be used, generally at least 1%, preferably at least 5% by weight, should be used and as much as 60%, preferably no more than 30% may be used.

In referring above to millimoles of catalyst this corresponds to the millimoles of alkali metal component since the catalyst is regarded or at least calculated as a complex of the alkali metal compound and the magnesium compound.

The "dilute solution viscosity" (DSV) referred to herein is defined as the inherent viscosity determined at 25° C. on a 0.4% solution of the polymer in toluene. It is calculated by dividing the natural logarithm of the relative viscosity by the percent concentration of the solution, i.e., it is the inherent viscosity measured at 0.4% concentration. The molecular weights reported herein are described from these viscosities.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

Into a one-gallon stainless steel reactor equipped with an agitator, a means for maintaining a pressurized atmosphere, and inlet and outlet means, there are charged under nitrogen 400 grams of butadiene as a hexane-butadiene-1,3 blend containing 23% butadiene, 1.0 millimoles of dibutyl magnesium followed by an amount of lithium butyl sulfide which is varied in a number of repeated runs to give varying Mg/Li ratios respectively. The reactor temperature is raised to 50° C. and maintained at that temperature for a period of 16 hours. After the polymerization period, the reaction mass is dropped into an equal volume or more of isopropanol containing 0.1% antioxident (p-t-butyl-cresol). The resultant precipitate is drum-dried and then analyzed with the results shown in the table below.

TABLE I

| RUN | A | B | C |
|---|---|---|---|
| Mg(C$_4$H$_9$)$_2$ (mM) | 1.0 | 1.0 | 1.0 |
| LiSC$_4$H$_9$ (mM) | 1.0 | 2.0 | 3.0 |
| Polymerization Temp. (°C.) | 50 | 50 | 50 |
| Time (hrs.) | 16 | 16 | 16 |
| Conversion (%) | 100 | 100 | 100 |
| Microstructure | | | |
| 1,2 | 9.3 | 7.3 | 7.5 |
| Cis-1,4 | 36.5 | 37.1 | 38.2 |
| Trans-1,4 | 54.2 | 55.6 | 54.3 |

EXAMPLE II

The procedure of Example I is repeated a number of times using in place of the lithium butyl sulfide equivalent amounts respectively of:

(a) NaSC$_4$H$_9$
(b) KSC$_4$H$_9$
(c) LiSC$_5$H$_{11}$
(d) LiSCH$_2$C$_6$H$_5$
(e) NaSC$_6$H$_5$
(f) KSC$_6$H$_{11}$
(g) LiC$_8$H$_{17}$

The results are similar to those obtained in Example I except that with the Na compounds the 1,2-microstructure contents are in the range of 17–25% and with the K compounds, the 1,2 contents are in the range of 37–54%.

EXAMPLE III

The procedure of Example I is repeated a number of times with similar results to those of Example I using in place of the dibutyl magnesium equivalent amounts respectively of diamyl magnesium, dioctyl magnesium, dibenzyl magnesium, diphenyl magnesium and dicyclohexyl magnesium.

EXAMPLE IV

The procedure of Example I is repeated twice using in place of the Li butyl sulfide, 1.0 and 2.0 millimoles of N-Li dibutylamine. The results are given below in Table II.

TABLE II

| RUN | D | E |
|---|---|---|
| Mg(C$_4$H$_9$)$_2$ (mM) | 1.0 | 1.0 |
| (C$_4$H$_9$)$_2$N Li (mM) | 1.0 | 2.0 |
| Polymerization Temp. (°C.) | 50 | 50 |
| Time (hrs.) | 16 | 16 |
| Microstructure | | |
| 1,2 | 8.1 | 8.3 |
| Cis-1,4 | 37.4 | 38.1 |
| Trans-1,4 | 54.5 | 54.6 |

EXAMPLE V

The procedure of Example IV is repeated a number of times using in place of the N-Li dibutyl amine an equivalent amount respectively of N-Li monobutylamine, N-Li diamylamine, N-Na dioctyl amine, N-K diphenyl amine, N-Li dicyclohexylamine, N-Li morpholine, N-Na-morpholine, N-K piperidine and N-Li, N'-methyl diethylene diamine. The results are similar to those obtained in Example IV except that with the Na compounds the 1,2-microstructure contents are in the range of 17–25%, and with the K compounds, the 1,2 contents are in the range of 37–54%.

EXAMPLE VI

The procedure of Example IV is repeated a number of times with results similar to those produced in Example IV, using in place of the dibutyl magnesium equivalent amounts respectively of dioctyl magnesium, diamyl magnesium, dibenzyl magnesium, diphenyl magnesium and dicyclohexyl magnesium.

EXAMPLE VII

The procedure of Example I is repeated a number of times with results similar to those obtained in Example I using equivalent amounts of $CH_3C\equiv CLi$ in place of the lithium butyl sulfide. When repeated using equivalent amounts respectively of $CH_3C\equiv CNa$ and $CH_3C\equiv CK$, results are obtained similar to those obtained in Example II when sodium butyl sulfide and potassium butyl sulfide are used.

In the event it is desirable to increase the 1,2 or vinyl content of butadiene polymers, it has been found that this may be effected in the present invention by using as an additional catalyst component or modifier, an amine, such as tetramethylethylenediamine (TMEDA). The amine with only a dialkyl magnesium does not act as polymerization catalyst. This is shown below in Example VIII. Other amines suitable for this purpose are chelating tertiary diamines in which the amine groups are separated by only two methylene groups such as 1,2-dipiperidyl-ethane, 1,2-dimorpholino-ethane, 1,2-dipiperazyl-ethane, etc.

However, when the procedures of Examples I and IV, which give polybutadienes of 7.5–9.3% 1,2-microstructure, are repeated with TMEDA as an additional catalyst component, such as in Example XIV, the percent of 1,2 structure in the product may be raised as high as 80% or more, depending on the temperature and the amount of TMEDA. Also, when the procedure of Example V is repeated using TMEDA as an additional catalyst component, as in Examples IX and X, the percent 1,2-microstructure is increased to 65–81%. The amount of amine used is advantageously in the range of 0.5 to 4 moles of amine per mole of dialkyl magnesium.

EXAMPLE VIII

Three polymerizations are conducted in 28 ounce polymerization bottles cleaned and swept out with nitrogen before introduction of 320 gms of a 23.5% solution of butadiene in hexane (75.2 gms of butadiene), following which the respective bottles are sealed with caps having a thin rubber sheet material through which catalyst components may be injected by a hypodermic needle. Dibutyl magnesium (1 ml.) and tetramethylethylenediamine (5 ml. of 1 molar solution in hexane) are added in this manner. The bottles are placed in different baths maintained at 30° C., 50° C. and 80° C., respectively, and allowed to stand for 44 hours. Then the bottles were cooled and contents poured into methanol. The bottles heated to 30° C. and 50° C. gave no polymer precipitate. The bottle heated to 80° C. gave only 0.43 gms of polymer precipitate. This shows that the combination of dibutyl magnesium and tetramethylethyldiamine (TMEDA) is not effective as a polymerization catalyst.

EXAMPLE IX

The procedure of Example VIII is repeated using 185 gms of blend containing 43.5 gms of butadiene. To each bottle there is added 0.4 ml. of 1 molar TMEDA, 0.2 ml. of normal dibutyl magnesium and 0.30 ml. of 0.635 molar $LiNEt_2$, in that order. The bottles are heated at 30° C., 50° C. and 80° C., respectively for 19 hours and then processed as in Example VIII and the products analyzed as indicated in the table below:

|  | 30° C. | 50° C. | 80° C. |
|---|---|---|---|
| Polymer yield (%) | 93 | 91.3 | 87.1 |
| DSV | 2.07 | 1.76 | 1.81 |
| Gel | 0.0 | 0.0 | 0.0 |
| Microstructure: |  |  |  |
| 1,2 (%) | 81.7 | 76.1 | 65.1 |
| Cis (%) | 9.1 | 11.5 | 15.4 |
| Trans (%) | 9.2 | 12.4 | 19.5 |

EXAMPLE X

The procedure of Example IX is repeated except that the $LiNEt_2$ and dibutylmagnesium are premixed before addition to the butadiene blend containing TMEDA, and the third bottle is maintained at 70° C. instead of 80° C., and the heating is maintained for 21.5 hours with the following results:

|  | 30° C. | 50° C. | 70° C. |
|---|---|---|---|
| Yield | 88.5% | 95.5% | 99.4% |
| $M_n$ | 248,261 | 234,320 | 192,340 |
| Microstructure: |  |  |  |
| 1,2 (%) | 80.5 | 75.6 | 68.5 |
| Cis (%) | 10.0 | 12.5 | 13.8 |
| Trans (%) | 9.5 | 11.9 | 17.7 |

EXAMPLE XI

The procedure of Example IX is repeated a number of times with results similar to those produced in Example IX, using in place of the dibutyl magnesium, equivalent amounts respectively of dioctyl magnesium, diamyl magnesium, dibenzyl magnesium, diphenyl magnesium and dicyclohexyl magnesium.

EXAMPLE XII

The procedure of Example IX is repeated a number of times with results similar to those obtained in Example IX, using in place of the $LiNEt_2$ equivalent amounts, respectively, of $LiNBu_2$; $LiNAm_2$; $LiN(C_6H_5)_2$; $LiN(C_6H_{11})_2$; N-Li morpholine; N-Li,N'-methyl diethylenediamine, and N-Li piperidine, respectively. When the above procedure is repeated using the corresponding Na and K compounds, similar results are obtained.

EXAMPLE XIII

The procedure of Example IX is repeated a number of times with results similar to those produced in Example IX, using in place of the TMEDA equivalent amounts, respectively, of 1,2-dipiperydyl-ethane, 1,2-dimorpholino-ethane, and 1,2-dipiperazyl-ethane.

EXAMPLE XIV

The procedure of Example IX is repeated a number of times with results similar to those obtained in Example IX, using in place of the LiNEt$_2$, equivalent amounts, respectively, of LiSC$_4$H$_9$; NaSC$_3$H$_9$; KSC$_5$H$_{11}$; LiSC$_5$H$_{11}$; LiSCH$_2$C$_6$H$_5$; NaSC$_6$H$_5$; KSC$_6$H$_{11}$ and LiC$_8$H$_{17}$.

EXAMPLE XV

The procedure of Example IX is repeated a number of times with results similar to those obtained in Example IX, using in place of the LiNEt$_2$, equivalent amounts, respectively, of CH$_3$C≡CLi; C$_2$H$_5$C≡CNa; C$_3$H$_7$C≡CK and C$_6$H$_5$C≡CLi.

The elastomeric polymers produced according to this invention may be mixed with the usual rubber compounding materials such as carbon blacks, fillers, processing oils and the like and still provide satisfactory physical properties when molded into tires and other fabricated articles. These elastomers are not only useful per se for the formation of injection moldings, compression moldings, extrusions, film coatings, spray coatings or adhesives, but also for the formation of latices from which foam or dipped goods may be prepared as well as in compositions with other rubbers for the improvement in physical properties of the latter.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

We claim:

1. The process for the hydrocarbon solution polymerization of a monomer composition containing at least 70 percent by weight of a conjugated diene comprising the steps of maintaining said monomer at a temperature of 0°–150° C. and in intimate contact with the catalyst composition comprising
   (a) a dihydrocarbyl magnesium compound in which the hydrocarbyl radicals have 1–10 carbon atoms selected from the class consisting of alkyl, carbocyclic aryl and cycloalkyl radicals, and
   (b) an alkali metal compound of the formula R(SM)$_n$ or RC≡CM, wherein M represents Li, Na, or K; R represents a hydrocarbyl radical of 1–10 carbon atoms; and n represents 1, 2, or 3;
   the concentrations of the respective components giving an Mg/alkali metal molar ratio of 0.01/1 to 100/1, said magnesium compound being present in a concentration of 0.1–10 millimoles per 100 grams of monomer.

2. The process of claim 1 in which the concentrations of the respective components gives an M$_g$/alkali metal molar ratio of 0.5/1 to 50/1.

3. The process of claim 2 in which said alkali metal compound is an alkali metal hydrocarbyl sulfide.

4. The process of claim 2 in which said alkali metal compound is a lithium alkyl sulfide.

5. The process of claim 2 in which said alkali metal compound is a sodium alkyl sulfide.

6. The process of claim 2 in which said alkali metal compound is a potassium alkyl sulfide.

7. The process of claim 3 in which said magnesium compound is a dialkyl magnesium.

8. The process of claim 7 in which said alkyl groups are butyl groups.

9. The process of claim 7 in which said dialkyl groups are amyl groups.

10. The process of claim 1 in which said diene is butadiene-1,3.

11. The process of claim 1 in which said monomer composition is substantially all butadiene-1,3.

12. The process of claim 11 in which said concentration of magnesium compound is 0.33–50 millimoles per 100 grams of monomer.

13. The process of claim 12 in which said alkali metal compound is an alkali metal sulfide and said temperature is in the range of 25°–100° C.

14. The process of claim 12 in which said alkali metal compound is a lithium alkyl sulfide.

* * * * *

UNITED STATES PATENT OFFICE
CERTIFICATE OF CORRECTION

Patent No. 4,174,431   Dated November 13, 1979

Inventor(s) Adel F. Halasa, James E. Hall & Donald N. Schulz

It is certified that error appears in the above-identified patent and that said Letters Patent are hereby corrected as shown below:

Column 2, line 41

"disadvantageous" should be -- advantageous --

Column 4, line 38

"1,24 and K" should read -- 1,2 and K --

Signed and Sealed this

Fourteenth Day of October 1980

[SEAL]

*Attest:*

*Attesting Officer*

SIDNEY A. DIAMOND

*Commissioner of Patents and Trademarks*